(12) United States Patent
Somayajula

(10) Patent No.: US 7,330,739 B2
(45) Date of Patent: Feb. 12, 2008

(54) METHOD AND APPARATUS FOR PROVIDING A SIDETONE IN A WIRELESS COMMUNICATION DEVICE

(75) Inventor: Shyam S. Somayajula, Austin, TX (US)

(73) Assignee: NXP B.V., Eindhoven (NL)

( * ) Notice: Subject to any disclaimer, the term of this patent is extended or adjusted under 35 U.S.C. 154(b) by 520 days.

(21) Appl. No.: 11/095,263

(22) Filed: Mar. 31, 2005

(65) Prior Publication Data

US 2006/0229028 A1   Oct. 12, 2006

(51) Int. Cl.
*H04M 1/00* (2006.01)
*H04B 1/38* (2006.01)

(52) U.S. Cl. ............... 455/570; 455/90.1; 379/388.07; 379/391

(58) Field of Classification Search ............. 455/570, 455/569.1, 90.1, 90.2; 379/388.07, 391; 370/201

See application file for complete search history.

(56) References Cited

U.S. PATENT DOCUMENTS

| | | | | |
|---|---|---|---|---|
| 5,909,432 | A * | 6/1999 | Arends et al. | 370/261 |
| 6,282,176 | B1 * | 8/2001 | Hemkumar | 370/276 |
| 6,434,110 | B1 * | 8/2002 | Hemkumar | 370/201 |
| 6,507,650 | B1 * | 1/2003 | Moquin | 379/387.01 |
| 6,751,203 | B1 | 6/2004 | Eshmawy et al. | |
| 6,768,795 | B2 * | 7/2004 | Feltstrom et al. | 379/391 |
| 6,801,623 | B1 | 10/2004 | Carter | |
| 7,042,986 | B1 * | 5/2006 | Lashley et al. | 379/52 |
| 2003/0063736 | A1 * | 4/2003 | King | 379/406.01 |
| 2004/0052358 | A1 | 3/2004 | Lashley et al. | |
| 2004/0116108 | A1 | 6/2004 | Ra | |
| 2004/0174989 | A1 | 9/2004 | Michaelis | |
| 2004/0179676 | A1 | 9/2004 | Okuda et al. | |

OTHER PUBLICATIONS

Atmel Corp., "ASFO1 GSM Voice Codec Macrocell", © 2003.
Beis, "An Introduction to Delta Sigma Converters", Oct. 16, 2004.
LUMINOSITY, "Glossary of Terms", downloaded from www.softcam.com © 1998-2001.
Texas Instruments, "TV320AIC Product Notification", Oct. 2003.
Liu, Tutorial on Designing Delta-Sigma Modulatiors—Part 1, Mar. 30, 2004.
Liu, Tutorial on Designing Delta-Sigma Modulatiors—Part 2, Apr. 1, 2004.
V-550, "1 Piece Plus Base USB Telephone With Dial Pad" downloaded from www.voivoice.com on Nov. 17, 2004.

\* cited by examiner

*Primary Examiner*—Duc M. Nguyen
(74) *Attorney, Agent, or Firm*—Peter Zawilski

(57) ABSTRACT

A wireless communication device is disclosed that provides a sidetone to the device user. The device converts an outbound analog audio signal to an outbound audio bitstream from which a sidetone bitstream is extracted. The device also converts an inbound digital audio signal to an inbound audio bitstream. A filter in the device both adds the sidetone bitstream to the inbound audio bitstream and filters the resultant added bitstreams to provide an analog audio signal with sidetone.

31 Claims, 6 Drawing Sheets

METHOD AND APPARATUS FOR PROVIDING A SIDETONE IN A WIRELESS COMMUNICATION DEVICE

CROSS REFERENCE TO RELATED PATENT APPLICATIONS

This patent application is related to the U.S. patent application entitled "Highly Integrated Radio-Frequency Apparatus and Associated Methods", inventors Navdeep S. Sooch and G. Tyson Tuttle, Ser. No. 10/426,042 filed Apr. 29, 2003, the disclosure of which is incorporated herein by reference in its entirety.

This patent application is also related to the U.S. patent application entitled "Wireless Communication System and Method With Hardware-Based Frequency Burst Detection", inventors Gong et al., (Ser. No. 10/955,569, filed Sep. 30, 2004) the disclosure of which is incorporated herein by reference in its entirety.

TECHNICAL FIELD OF THE INVENTION

The disclosures herein relate generally to wireless communication systems, and more particularly, to wireless communication systems that employ sidetones.

BACKGROUND

Conventional wired or wireless telephones typically employ a sidetone feedback mechanism between the microphone and the headphone/speaker of a user's telephone. This sidetone feedback mechanism allows the user to hear his or her own voice at an attenuated level while speaking into the phone. This gives the user comfort and assurance that the user's speech is being transmitted through a connection to another phone. Simply speaking, the "sidetone" refers to the sound of the user's own voice as heard in the user's telephone receiver at an attenuated level.

Sidetones may be employed in modern digital wireless telephones such as those employing the GSM standard. Digital wireless telephones include a transmit or outbound path having a microphone, microphone preamplifier, gain stage and an analog to digital converter (ADC). The output signal of the ADC is filtered and decimated to produce a pulse code modulated (PCM) signal that is transmitted to another phone. PCM is a commonly used digital representation of an analog signal. Digital wireless telephones also include a receive or inbound path that drives the headphone/speaker of the telephone with audio received from another telephone. The receive path includes a receiver that provides received PCM data to a digital to analog converter (DAC) that converts the received digital audio signal to analog. The output of the DAC is filtered and amplified to provide a received analog audio signal that drives the headphone/speaker. To provide the desired sidetone, an attenuated version of the PCM signal from the transmit path is simply digitally added to the PCM signal in the receive path. In this digital sidetone approach, the audio signal that the user hears in the headphone/speaker includes both the received audio signal and a sidetone of smaller amplitude. This digital sidetone approach employing digital addition works well in many applications. However, latency problems may occur when the digital sidetone signal is delayed in the wireless telephone before being supplied to the earphone. In this case the local sidetone heard by the user may appear to be out of sync, or delayed in time, with respect to the user's speech. This can be very annoying to the wireless telephone user.

What is needed is a wireless communication apparatus and method that provides a sidetone to the user without the problems described above.

SUMMARY

Accordingly, in one embodiment, a method is disclosed for operating a wireless communication device including a transmitter and a receiver. The method includes converting an outbound analog audio signal to an outbound audio bitstream in a first path. The first path includes a transmitter that transmits the outbound audio bitstream. The method also includes converting an inbound digital audio signal to an inbound audio bitstream in a second path. The second path includes a receiver that receives the inbound digital audio signal. The method also includes extracting a sidetone bitstream from the outbound audio bitstream. The method further includes supplying the inbound audio bitstream and the sidetone bitstream to a filter in the second path. The filter adds the sidetone bitstream to the inbound audio bitstream to produce a resultant signal. The filter also filters the resultant signal to provide an analog audio signal with sidetone.

In another embodiment, a wireless communication device is disclosed that includes a transmitter and a receiver. The transmitter is situated in an outbound path and the receiver is situated in an inbound path. The device includes an analog to digital converter (ADC) that is situated in the outbound path. The ADC converts an outbound analog audio signal to an outbound audio bitstream that is supplied to the transmitter. The device also includes a digital to analog converter (DAC) that is situated in the inbound path. The DAC converts an inbound digital audio signal, supplied by the receiver, to an inbound audio bitstream. The device further includes a filter that is situated in the inbound path. The filter is coupled to the DAC to receive the inbound audio bitstream. The filter is also coupled to the outbound path to receive the outbound audio bitstream. The filter adds the outbound bitstream as a sidetone to the inbound audio bitstream to produce a resultant signal. The filter filters the resultant signal to provide an analog audio signal with sidetone.

In yet another embodiment, an integrated circuit (IC) device is disclosed that includes a transmitter and a receiver. The transmitter is situated in an outbound path and the receiver is situated in an inbound path. The device includes an analog to digital converter (ADC) that is situated in the outbound path. The ADC converts an outbound analog audio signal to an outbound audio bitstream that is supplied to the transmitter. The device also includes a digital to analog converter (DAC) that is situated in the inbound path. The DAC converts an inbound digital audio signal, supplied by the receiver, to an inbound audio bitstream. The device further includes a filter that is situated in the inbound path. The filter is coupled to the DAC to receive the inbound audio bitstream. The filter is also coupled to the outbound path to receive the outbound audio bitstream. The filter adds the outbound bitstream as a sidetone to the inbound audio bitstream to produce a resultant signal. The filter filters the resultant signal to provide an analog audio signal with sidetone.

BRIEF DESCRIPTION OF THE DRAWINGS

The appended drawings illustrate only exemplary embodiments of the invention and therefore do not limit its scope, because the inventive concepts lend themselves to other equally effective embodiments.

DETAILED DESCRIPTION

Figure 1:
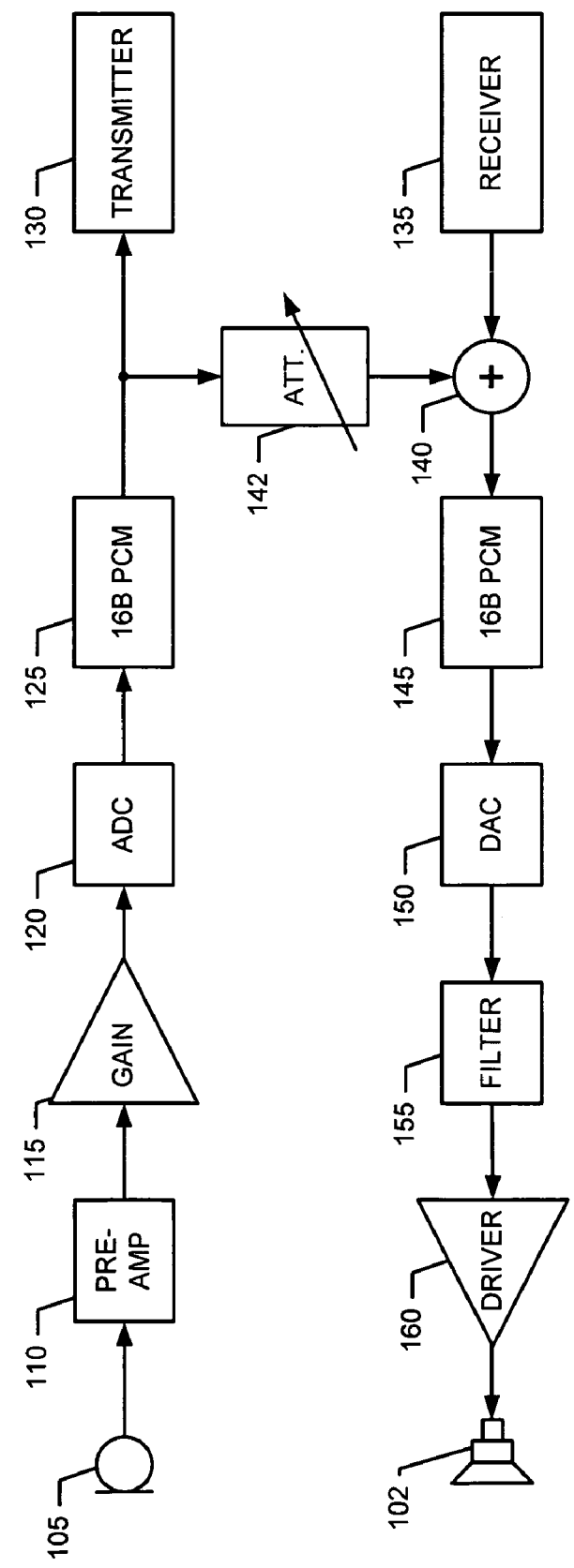
FIG. 1 is a block diagram of a wireless communication device employing digital sidetone technology.

FIG. 1 shows a wireless communication device 100 employing conventional sidetone technology wherein a digital sidetone is added to a received digital audio signal before the received digital audio signal is supplied to an earphone or loudspeaker 102. More particularly, wireless communication device 100 includes a microphone 105 coupled by a preamp 110 and a subsequent gain stage 115 to the input of an analog to digital converter (ADC) 120. ADC 120 digitizes the user's speech and PCM stage 125 converts the resultant digitized audio signal to a 16-bit (16B) PCM digital audio signal. This PCM digital audio signal is supplied to transmitter 130 for transmission to other wireless communication devices. Receiver 135 receives transmissions from other wireless communication devices and processes incoming radio frequency signals down to baseband. Receiver 135 provides the received digital audio signals to adder 140. A variable attenuator 142 couples PCM stage 125 to adder 140 thus providing an attenuated version of the outgoing digital audio signal to adder 140 as a digital sidetone signal. Adder 140 sums this digital sidetone signal with the received incoming digital audio signal. The resultant summed signal is provided by a PCM stage 145 to digital to analog converter (DAC) 150. PCM is a commonly used digital representation of an analog signal. PCM stage 145 performs backend processing such as gain control, noise suppression and filtering in a conventional manner. DAC 150 converts the digital signal it receives to a corresponding analog signal that is filtered by a filter 155 coupled to the output of DAC 150. The resultant audio signal thus appearing at the output of filter 155 includes both an analog version of the received audio signal and an analog version of the sidetone signal. Driver 160 amplifies the received audio signal and sidetone and then supplies these analog signals to an earphone or loudspeaker 102.

While the all-digital sidetone approach of FIG. 1 performs well in some applications, problems can result in other applications such as described below. For example, latency of the sidetone signal with respect to the received audio signal may be observed in wireless communication systems employing time domain isolation (TDI) technology. More information with respect to TDI technology is provided in the U.S. patent application entitled "Highly Integrated Radio-Frequency Apparatus and Associated Methods", inventors Navdeep S. Sooch and G. Tyson Tuttle, Ser. No. 10/426,042 filed Apr. 29, 2003, the disclosure of which is incorporated herein by reference in its entirety, and also in U.S. patent application entitled "Wireless Communication System and Method With Hardware-Based Frequency Burst Detection", inventors Gong et al., (Ser. No. 10/955,569, filed Sep. 30, 2004) the disclosure of which is incorporated herein by reference in its entirety.

Figure 2:
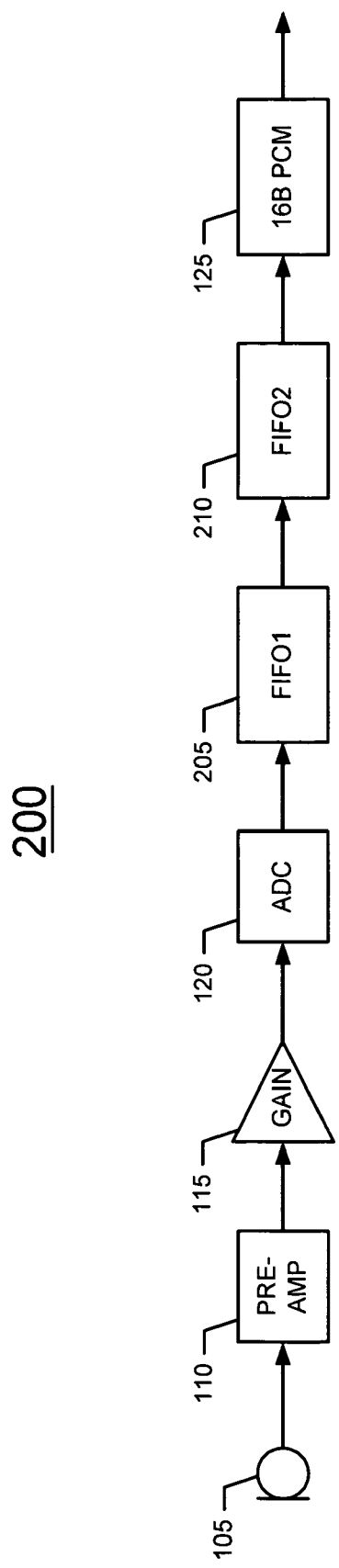
FIG. 2 is a block diagram of a communication device that experiences a latency problem when employing a digital sidetone.

FIG. 2 illustrates a portion of a wireless communication device 200 that exhibits the above referenced latency problem. Wireless communication device 200 of FIG. 2 includes several elements in common with wireless communication device 100 of FIG. 1. Like numbers indicate like elements when comparing FIG. 2 with FIG. 1. ADC 120 converts the analog speech signal into a one bit digitized audio signal that is supplied to a first-in first-out (FIFO1) circuit 205. Thus, the one bit digitized speech signal is initially stored by FIFO1 circuit 205. A communication device that employs TDI such as device 200 includes both digital processing circuits and radio-frequency circuits. To reduce digitally generated noise, when the radio frequency circuits are activated, the digital processing circuits are inactivated. Conversely, when the digital processing circuits are activated, the radio frequency circuits are inactivated. In device 200, when the digital processing circuits are activated, FIFO1 (205) is cleared to FIFO2 (210) and the one bit data supplied thereto by ADC 120 is decimated/filtered and converted to a 16 bit PCM audio signal by PCM stage 125. The 16 bit PCM digital audio signal at PCM stage 125 can then be added as a sidetone to the incoming digital data from receiver 135 as shown in wireless communication device 100 of FIG. 1.

In this TDI implementation, when the digital circuits are inactivated and the RF circuits are activated, the FIFOs hold the digitized speech signal of the user speaking into microphone 105. However, the delay that occurs while the digitized speech is stored in the FIFOs when the digital circuitry is inactivated and the RF circuitry is activated, causes the digital sidetone signal to be delayed with respect to the user's actual voice and the incoming received digital audio signal. This delay can be 5 ms or more and can be annoying to the user of device 200. Thus, a wireless communication system employing a totally digital sidetone approach may exhibit delay problems in a time domain isolation (TDI) implementation such as that discussed above.

Figure 3:
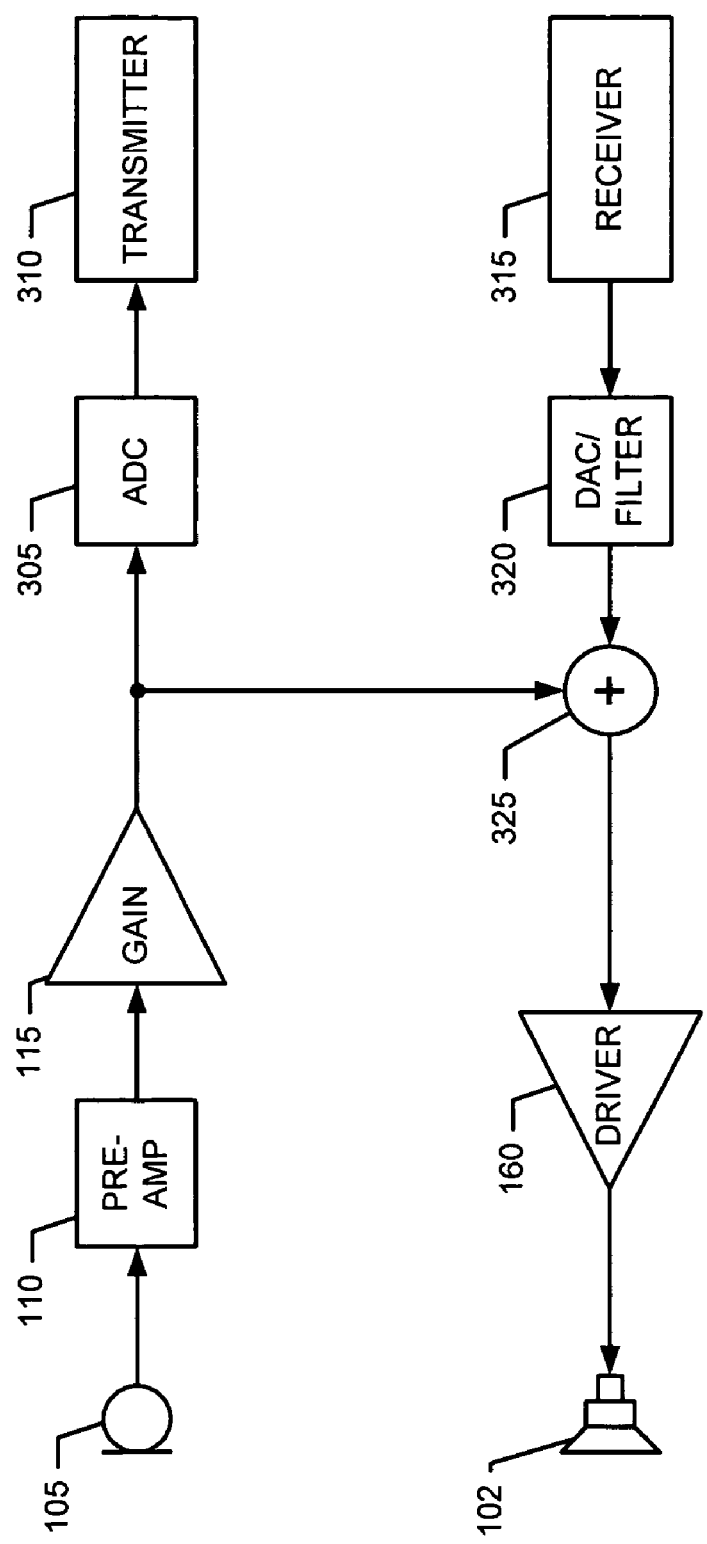
FIG. 3 is a block diagram of a wireless communication system employing analog sidetone.

An alternative to the two digitally generated sidetone approaches discussed above is illustrated in the block diagram of FIG. 3 which shows a wireless communication device 300 employing an analog generated sidetone. Wireless communication device 300 includes elements in common with wireless communication device 100 of FIG. 1. Like numbers are used to indicate like elements when comparing the wireless devices of FIG. 3 and FIG. 1. Wireless communication device 300 is considered to be a near-end device in that it communicates with another device referred to as the far-end device. The user of near-end device 300 speaks into microphone 105. Preamplifier 110 and gain stage 115 amplify the audio signal from microphone 105. Gain stage 115 is coupled to ADC 305 which converts the analog audio signal at its input to a digital audio signal at its output. The output of ADC 305 is coupled to transmitter 310 which transmits the digital audio signal to another wireless communication device, namely the far-end communication device. Receiver 315 receives radio frequency signals that carry a digital audio signal from the far-end communication device. The output of receiver 315 is coupled to DAC/filter 320 that converts the digital audio signal provided by receiver 315 to an analog audio signal that is supplied to one input of a two input adder or summer 325. The remaining input of adder 325 is coupled to the output of gain stage 115. Adder 325 adds the analog audio signal from gain stage 315 as a sidetone to the far end analog audio signal. Adder 325 provides the resultant analog audio signal with sidetone to driver amplifier 160 which drives speaker 102.

While this wireless communication device 300 which employs analog sidetone does not suffer from the latency problems experienced by device 200, device 300 experiences a problem wherein the sidetone audio sounds richer than the audio received from the far-end. This occurs because the far-end audio signal is bandwidth limited, typically to 4 KHz, whereas the sidetone is essentially bandwidth unlimited. Thus, the sidetone generated locally at the near-end device 300 sounds richer than the audio received from the far end. Since speaker 102 typically exhibits peaking at higher frequencies, the local sidetone can sound annoyingly louder than the received far-end audio signal.

Figure 4:
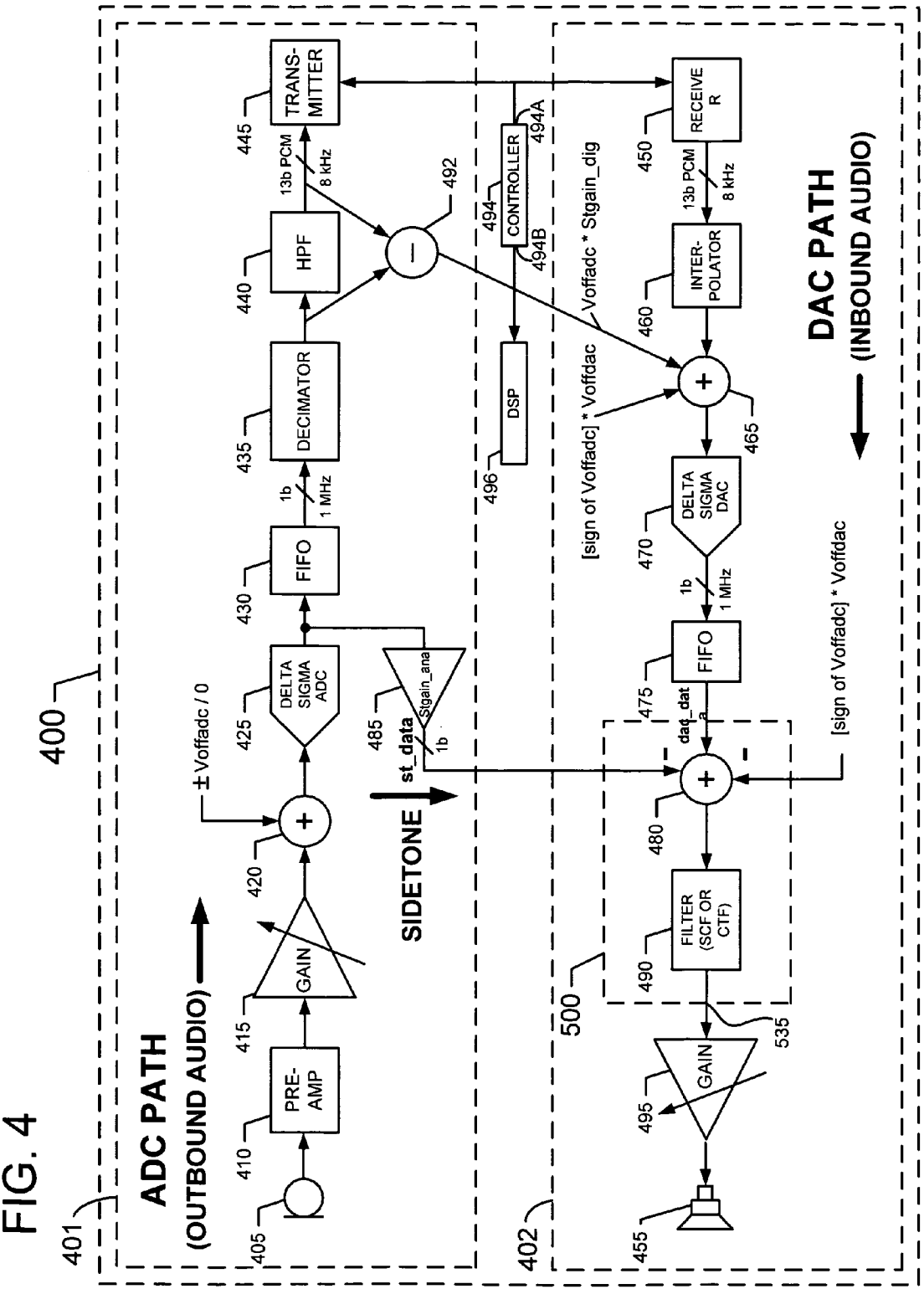
FIG. 4 is a block diagram of the disclosed wireless communication device.

FIG. 4 is a schematic diagram of one embodiment of the disclosed wireless communication device 400. Communication device 400 includes a microphone 405 into which the user of device 400 speaks. In this example, communication device 400 is referred to as the near-end device. The user of communication device 400 desires to communicate with the user of another communication device (not shown) referred to as the far-end device. The audio signal produced by microphone 405 is referred to as the outbound audio signal. The signal that communication device 400 receives from the far-end communication device (not shown) is referred to as the inbound audio signal.

Microphone 405 is coupled to a preamplifier 410 that amplifies the outbound audio signal. Preamplifier 410 is coupled to a variable gain stage 415 that provides additional gain to the outbound audio signal. It is noted that, up until this point, the outbound audio signal is an analog outbound audio signal. Gain stage 415 is coupled by adder 420 and analog to digital converter (ADC) 425. The function of adder 420 will be discussed in more detail below. The analog outbound audio signal is thus provided to ADC 425. In this particular embodiment, a delta sigma modulator is employed as ADC 425. ADC 425 converts the analog outbound audio signal to an outbound audio bitstream. ADC 425 includes a one bit output that is coupled via FIFO circuit 430 to a decimator 435. The function of a FIFO 430 as it relates to TDI will be discussed in more detail below. Decimator 435 and high pass filter 440 respectively decimate and filter the one bit audio bitstream to provide a 13 bit PCM digital outbound audio signal at the output of filter 440. The input of transmitter 445 is coupled to the output of filter 440 so that transmitter 445 transmits the PCM digital outbound audio signal to a far-end communication device (not shown). The communication path formed above from microphone 405 to transmitter 445 may be referred to as the outbound path or ADC path 401. The communication path discussed below from receiver 450 to earphone/loudspeaker 455 may be referred to as the inbound path or the DAC path 402.

As discussed above, receiver 450 of near-and communication device 400 receives far-end radio frequency signals from another communication device (not shown). The received radio frequency signals include inbound audio signals. Receiver 450 receives these radio frequency signals and generates inbound digital audio signals. An interpolator 460 is coupled to receiver 450 to interpolate the inbound digital audio signals provided thereto. In one embodiment, the data rate at which receiver 450 provides data to interpolator 460 is 8 kHz or 8 ksps. The 8 ksps data rate repeats itself at all integer multiples of 8 ksps. To filter out these images, a very low frequency high order analog filter can be employed. However, by oversampling the received data with, for example a 1 MHz signal, image filtering can be performed in digital, i.e digitally. Interpolator 460 performs this filtering and up-conversion. The output of interpolator 460 is coupled via an adder 465 to digital to analog converter (DAC) 470. The operation of adder 465 will be discussed later in more detail below. In this particular embodiment, DAC 470 is a delta sigma modulator. DAC 470 converts the 13 bit PCM signal provided thereto to a one bit inbound bitstream audio signal, dac_data. This inbound bitstream audio signal is provided via FIFO 475 as data to one input of an adder 480. Another input of adder 480 is coupled via a gain stage 485 to the output of ADC 425 in the side tone path. Gain stage 485 exhibits a gain, Stgain_ana (sidetone gain). Gain stage 485 extracts some of outbound audio bitstream at ADC 425 to use as a sidetone. The extracted bitstream audio signal that is supplied by gain stage 485 to adder 480 is referred to as the sidetone signal (st_data). The inbound digital audio signal coupled by FIFO 475 to adder 480 is referred to as the DAC signal (dac_data) or inbound bitstream audio signal.

Adder 480 adds the sidetone signal, st_data, to the inbound bitstream audio signal, dac_data, and filter 490 filters the resultant signal. In one embodiment, filter 490 is a switched capacitor filter (SCF). In another embodiment, filter 490 is a continuous time filter (CTF). The sidetone signal from the ADC path 401 is thus combined with the inbound bitstream audio signal in the inbound path 402 through the action of adder 480 and filter 490. Together, adder 480 and filter 490 form a filter block 500 that is shown in more detail in FIGS. 5A and 5B that are discussed below. The signal at the output of filter 490 is an analog signal that includes both the inbound audio signal and a sidetone component. This analog signal is amplified by variable gain stage 495 which drives earphone/loudspeaker 455. Both the inbound audio signal and the sidetone component experience the same filtering, band-limiting action of filter 490 and thus the sidetone does not sound richer or louder than the inbound audio signal when reproduced by earphone/speaker 455. In one embodiment, device 400 (exclusive of microphone 405 and earphone/loudspeaker 455) is fabricated on a single integrated circuit (IC). Device 400 may also be segmented into multiple ICs as desired depending on the particular application.

Figure 5A:
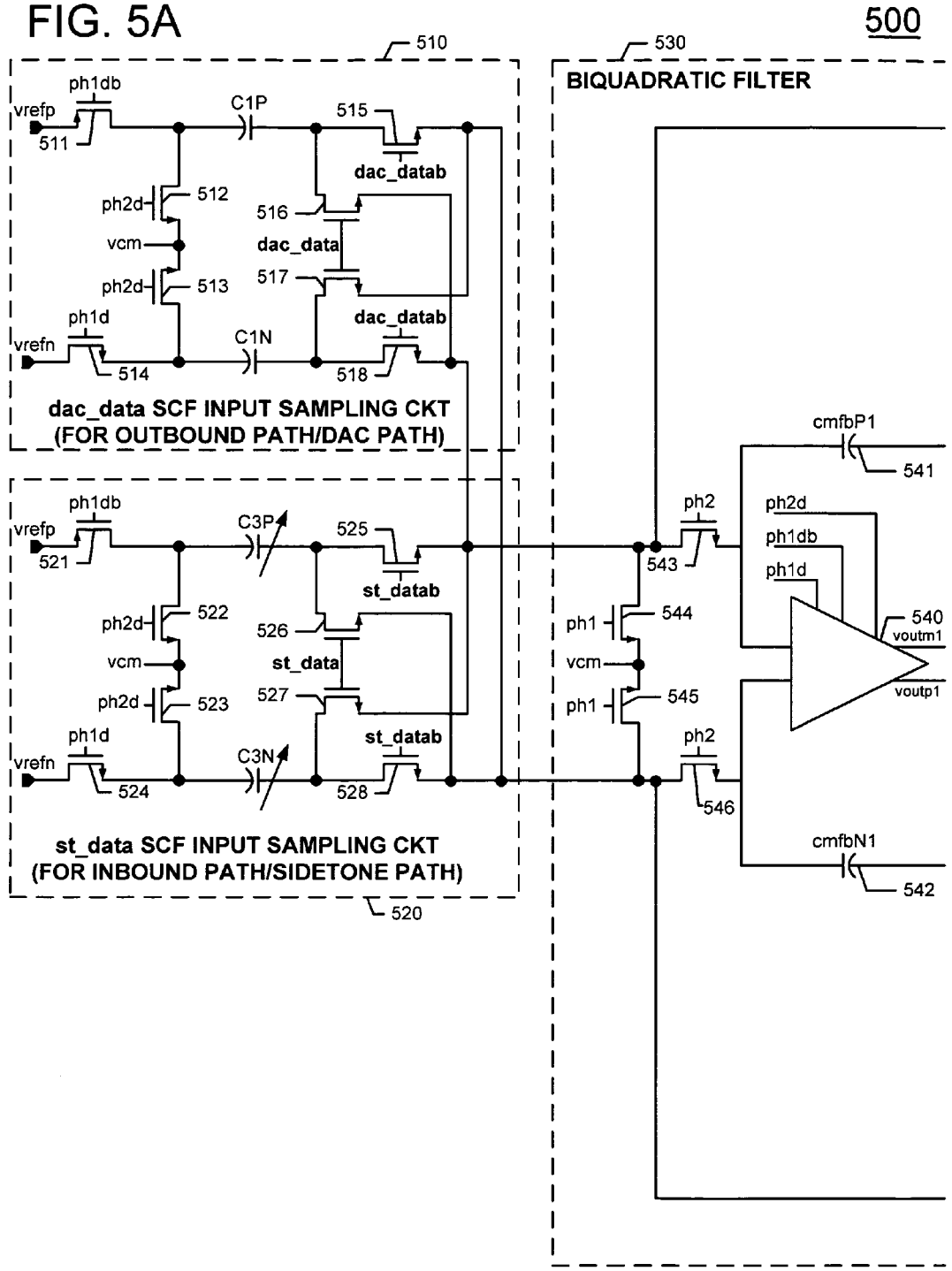
FIGS. 5A and 5B together show a schematic diagram of a filter employed by the wireless communication system of FIG. 4
Figure 5B:
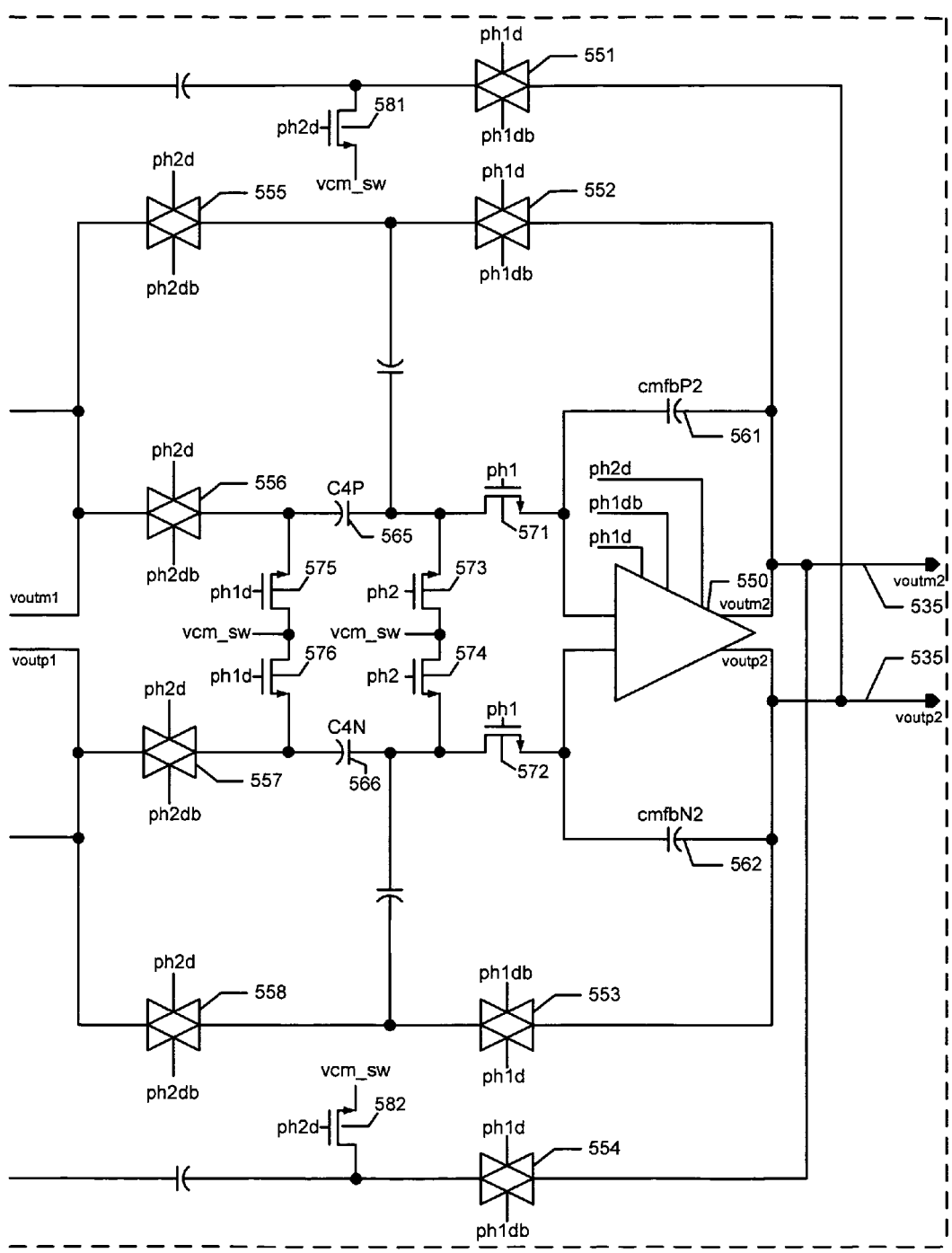

FIG. 5A-5B together form a schematic diagram of a switched capacitor filter/adder that may be employed as filter block 500 in one embodiment of the disclosed wireless communication device. Filter block 500 performs two functions. Filter block 500 adds the sidetone signal, st_data, from ADC path 401 to the dac_data signal in DAC path 402. Filter block 500 also filters the analog signal that results from the combination or addition of the st_data signal to the dac_data signal. Filter block 500 is a biquadratic switched capacitor filter (SCF) in this particular embodiment of wireless communication system 400. A continuous time filter and adder may also be employed as filter block 500.

Filter block 500 includes a dac_data SCF input sampling circuit 510 that is coupled to FIFO 475 in DAC path 402 to receive and process the 1 bit dac_data signal, namely the inbound audio bitstream. Input sampling circuit 510 includes FET switches 511, 512, 513, 514, 515, 516, 517, 518 and capacitors C1P and C1N that are configured as shown in FIG. 5A. FET switches 511 and 512 are coupled to reference voltages vrefp and vrefn, respectively. Clock signal, ph1$d$, and its complement, ph1$db$, drive FET switches 514 and 511, respectively. Clock signal ph2$d$ drives FET switches 512 and 513. A voltage, vcm, is supplied to the common node between FET switches 512 and 513. Amplifiers 540 and 550, discussed later in more detail, have a limited range of operation dictated by the supply voltage. The vcm voltage is used to center the signal swing of amplifiers 540 and 550 such that they are linear in a normal mode of operation. The data signal, dac_data, is supplied to the node between FET switches 516 and 517 as shown. The dac_data signal is the inbound audio bitstream that is supplied by DAC 470 and FIFO 475 in DAC path 402 of FIG. 4. The complement of the dac_data signal, namely dac_datab, is supplied to FET switches 515 and 518 as shown.

Filter block 500 also includes an st_data SCF input sampling circuit 520 that exhibits a topology similar to the dac_data LCF input sampling circuit 510 discussed above. St_data SCF input sampling circuit 520 is coupled to st_gain amplifier 485 of ADC path 401 to receive a 1 bit gained-up sidetone signal, st_data, therefrom. Sampling circuit 520 includes FET switches 521, 522, 523, 524, 525, 526, 527, 528 and variable capacitors C3P and C3N that are configured as shown in FIG. 5A. FET switches 521 and 522 are coupled to reference voltages vrefp and vrefn, respectively. Clock signal ph1$d$ and its complement ph1$db$ drive FET switches 524 and 521, respectively. Clock signal ph2$d$ drives FET switches 522 and 523. Voltage vcm is supplied to the common node between FET switches 522 and 523. The sidetone audio signal, st_data, is supplied to the node between FET switches 526 and 527. The st_data signal is the 1 bit sidetone audio signal extracted or derived from the outbound audio bitstream in ADC path 401. The st_data signal is supplied by stgain amplifier 485 in ADC path 401 of FIG. 4. The complement of the st_data signal, namely st_datab, is supplied to FET switches 525 and 528 as shown.

Dac_data SCF input sampling circuit 510 and st_data input sampling circuit 520 are coupled together and to biquadratic switched capacitor (SCF) 530 as shown in FIG. 5A such that sidetone st_data signal from circuit 520 is effectively added to the inbound dac_data signal from DAC 470 and FIFO 475. Biquadratic SCF 530 filters the resultant signal to provide an analog audio output signal at its output 535 of FIG. 5B. This analog audio output signal at filter output 535 includes both an analog version of the inbound audio signal received from the far-end communication device and an analog version of the sidetone signal from the ADC path of near-end communication device 400.

In this embodiment, filter 490 of filter block 500 is a biquadratic SCF 530. Biquadratic SCF 530 is a two stage filter including a first stage integrating amplifier 540 and a second stage integrating amplifier 550. Integrating capacitors 541 (cmfbP1) and 542 (cmfbN1) are situated in feedback paths associated with integrating amplifier 540 as shown. FET switches 543, 544, 545, and 546 switchably couple dac_data SCF input sampling circuit 510 and st_data SCF input sampling circuit 520 to integrating amplifier 540 as shown. Clock signal ph1 is supplied to FET switches 544 and 545, and clock signal ph2 is supplied to FET switches 543 and 546 to control the switching thereof. The voltage vcm is supplied to the node between FET switches 544 and 545. Integrating amplifier 540 includes inputs ph1$d$, ph1$db$, ph2$d$ to which clock signals by the same names are supplied. Integrating amplifier 540 also includes two outputs, voutm and voutp, which are coupled via feedback paths including integrating capacitors 541 and 542, respectively, back to the inputs of integrating amplifier 540.

The outputs voutm1 an voutp1 of first integrating amplifier 540 are coupled to second integrating amplifier 550 as shown in FIG. 5B. FIG. 5B depicts the second stage of biquadratic SCF 530 which includes the second integrating amplifier 550. An array of FET switching transistors and tri-state device control the application of the voutm1 and voutp1 signals in the second stage of biquadratic filter depicted in FIG. 5B. More specifically, the second stage includes tri-state devices 551, 552, 553 and 554 to which the ph1$d$ and ph1$db$ clock signals are applied to control the switching thereof. The second stage also includes tri-state device 555, 556, 557 and 558 configured as shown and to which the ph2$d$ and ph2$db$ clock signals are applied to control the switching thereof.

Integrating capacitors 561 (cmfbP2) and 562 (cmfbN2) are coupled from the respective outputs voutm2 and voutp2 of integrating amplifier 550 to the respective inputs thereof. Capacitors 565 (C4P) and 566 (C4N) are situated in the respective input lines leading to the inputs of integrating amplifier 550. Switching FETs 571, 572, 573, 574, 575 and 576 are coupled together and to capacitors 565 and 566 to form a switching array between the outputs, voutm1 and voutp1, of first integrating amplifier 540 and the inputs of second integrating amplifier 550 as shown. Switching FETs 581 and 582 are coupled respectively to tri-state devices 551 and 552 which handle full voltage supply range signals. The ph2$d$, ph1$db$ and ph1$d$ signals are supplied to respective inputs of second integrating amplifier 550 having the same names.

The second integrating amplifier 550 includes outputs voutm2 and voutp2 which form the overall output 535 of filter block 500. In this switched capacitor implementation, filter block 500 receives the 1 bit dac_data inbound audio bitstream from the far-end device and effectively adds thereto the one bit st_data audio bitstream sidetone that was extracted from the outbound path of the near-end device 400. Moreover, filter block 500 filters the resultant signal to produce an analog audio signal including sidetone at output 535.

A DC offset exists in the ADC path 401 of the communication device 400 that is depicted in FIG. 4. It is desirable that this DC offset of the sidetone be removed. In the methodology now described, the DC offset in the ADC path is extracted and fed to the DAC 470 in the DAC path 402 such that when the sidetone is summed with the inbound audio signal at adder 480, the sidetone's DC offset is cancelled out.

When a one bit delta sigma modulator is employed as ADC 425 in the ADC path 401, the delta sigma modulator/ADC exhibits pattern noise at frequencies directionally proportional to the input voltage of the delta sigma modulator/ADC 425. The ADC should be guaranteed some DC input level such that at low signal levels, the idle tones of the ADC are out-of-band for communication device 400. On power-up of device 400, a digital calibration is performed to measure the analog offset in the ADC path 401 in which ADC 425 is located. If this offset is not larger than |4%| of full scale, a plus or minus offset is added to ADC 425 in analog by adder 420. Delta sigma modulator/DAC 470 in DAC path 402 is offset for the same reason. This offset can be either positive or negative. Since this offset is a known quantity it can be removed in switched capacitor filter (SCF) 490 of DAC path 402. The remaining offset in DAC path 402 is due to the SCF and driver amplifier 495. Since the sidetone is added to the inbound audio signal in filter block 500, the inbound audio signal will have the DC offset of the ADC path unless corrective action is taken.

Communication device 400 of FIG. 4 cancels the DC offset that the sidetone would otherwise introduce in DAC path 402. This cancellation occurs in filter block 500. More specifically, when communication device 400 is powered up, ADC 425 is calibrated and the DC offset of the ADC path, Voffadc, is determined in digital. Voffadc is then added by adder 420 to the signal in DAC path 401. Once Voffadc is determined, the offset that needs to be added to DAC path 402 is defined as [sign of Voffadc]*Voffdac wherein Voffdac is the desired offset of the DAC path 402. In an example wherein Voffadc is positive, then the following signal appears at the output of filter block 500: Voffdac+ Voffadc*Stgain_dig−Voffdac−Voffadc*Stgain_ana. Gain stage 485 adds gain control to the sidetone path. Stgain_ana is the gain provided by gain stage 485. The offset in the sidetone path also sees this gain. Hence the offset compensation path also needs to be scaled by the same amount. Stgain_dig is the gain provided digitally in response to a device user request.

In summary, the signal path from pre-amplifier 410 exhibits a DC offset due to process mismatch or deliberate addition in adder 420. This offset will be coupled to filter block 500 in the DAC path 402 through sidetone insertion. To cancel this offset, the offset is first determined in digital in high pass filter 440 and subtractor 492. The output of subtractor 492 is the offset of the ADC path 401. This offset is then scaled by a factor stgain_dig and subtracted from the digital input signal at adder 465. Delta sigma modulator 470 also requires a DC offset to move its idle tones out of the audio band. To assure that the summation of the voffadc and voffdac does not result in a zero, the sign of voffadc is extracted and used as the sign of voffdac. The offset from the analog is hence added to the extracted offset from the digital in adder 480 and will be cancelled out to the first order. The offset from the analog refers to the path from preamplifier 410 to ADC 425. The extracted offset from the digital refers to the output of subtractor 492.

In wireless communication device 400 of FIG. 4, a controller 494 effects time domain isolation (TDI) by inactivating noise producing digital circuits such as digital signal processor (DSP) 496 when radio frequency (RF) circuits such as transmitter 445 and receiver 450 are activated. Conversely, controller 494 inactivates these radio frequency circuits when digital circuits in communication device 400 are activated. Controller 494 thus controls the time periods when the radio frequency circuits and the digital circuits are alternatingly activated. The RF circuitry is activated during predetermined periods of time and the digital processing circuitry is activated during other predetermined periods of time. In this manner, the noise producing digital circuits do not negatively impact radio frequency reception and transmission by the radiofrequency circuits. Controller 494 includes a control output 494A that is coupled to transmitter 445 and receiver 450 to control the time periods during which these radio frequency circuits are activated and inactivated. Controller 494 further includes an output 494B that is coupled to digital circuits in communication device 400 such as digital signal processor (DSP) 496. Other digital circuits that controller 494 may deactivate include, decimator 435, high pass filter 440, subtractor 492, interpolator 460, adder 465 and delta sigma DAC 470, although specific connections between these circuits and controller 494 are not shown. DSP 496 is coupled to both transmitter 445 and receiver 450 by a connection (not shown) to process signals associated with transmission and reception. DSP 496 performs noise producing digital operations on the signals received and transmitted by communication device 400. For example, DSP 496 locates the frequency burst (FB) in received radio signals. Communication device 400 avoids latency problem associated with FIFO 430 and FIFO 475 by extracting the sidetone from ADC 425 before the outbound audio signal reaches FIFO 430. Communication device 400 further avoids latency problems associated with the FIFOs by summing the extracted sidetone with the inbound audio bitstream in filter block 500. Thus the sidetone does not reach the digital circuits between FIFO 430 and transmitter 445 and between receiver 450 and FIFO 475 that are inactivated by controller 494 to avoid digital noise during RF activities. For these reasons, the extracted sidetone does not experience the latency or delay problems that it otherwise may have experienced if it were fed through the FIFOs.

A wireless communication device is thus disclosed that, in one embodiment, extracts a 1 bit sidetone signal from a delta sigma modulator ADC in the ADC path that processes the outbound audio signal. A delta sigma modulator DAC in the DAC path converts the inbound digital audio signal to a one bit inbound audio signal. The 1 bit sidetone signal is added to or combined with the one bit inbound audio signal in filter block 500 in the DAC path. Filter block 500 performs two functions. First, filter block 500 filters both the one bit sidetone signal and the one bit inbound audio signal. Secondly, filter block 500 also adds or combines the one bit sidetone signal with the one bit inbound audio signal to product the resultant analog audio signal that includes both sidetone and inbound audio at earphone/loudspeaker 455.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of operating a wireless communication device comprising:
    converting an outbound analog audio signal to an outbound audio bitstream in a first path that includes a transmitter which transmits the outbound audio bitstream;
    converting an inbound digital audio signal to an inbound audio bitstream in a second path that includes a receiver which receives the inbound digital audio signal;
    extracting a sidetone bitstream from the outbound audio bitstream; and
    supplying the inbound audio bitstream and the sidetone bitstream to a filter in the second path, the filter adding the sidetone bitstream to the inbound audio bitstream to produce a resultant signal, the filter also filtering the resultant signal to provide an analog audio signal with sidetone.

2. The method of claim 1, wherein the converting an outbound analog audio signal step comprises converting, by a delta sigma analog to digital converter (ADC), the outbound analog audio signal to the outbound audio bitstream.

3. The method of claim 1, wherein the converting an inbound digital audio signal step comprises converting, by a delta sigma digital to analog converter (DAC), the inbound digital audio signal to the inbound audio bitstream.

4. The method of claim 1, further comprising transmitting, by the transmitter, a pulse code modulation (PCM) representation of the outbound audio bitstream.

5. The method of claim 1 further comprising receiving, by the receiver, the inbound digital audio signal to produce a PCM representation of the inbound digital audio signal.

6. The method of claim 1, wherein the filter comprises a switched capacitor filter.

7. The method of claim 1, wherein the filter comprises a continuous time filter.

8. The method of claim 1, further comprising canceling, by the filter, a DC offset exhibited by the sidetone bitstream.

9. The method of claim 1, further comprising scaling the sidetone bitstream prior to supplying the sidetone bitstream to the filter.

10. The method of claim 1, wherein the wireless communication device includes RF circuitry and digital processing circuitry, the transmitter and receiver being included in the RF circuitry, the method further comprising:
activating the RF circuitry and inactivating the digital processing circuitry, by a controller, during first periods of time; and
inactivating the RF circuitry and activating the digital processing circuitry, by the controller, during second periods of time.

11. A wireless communication device comprising:
a transmitter situated in an outbound path;
a receiver situated in an inbound path;
an analog to digital converter (ADC), situated in the outbound path, that converts an outbound analog audio signal to an outbound audio bitstream that is supplied to the transmitter;
a digital to analog converter (DAC), situated in the inbound path, that converts an inbound digital audio signal, received by the receiver, to an inbound audio bitstream; and
a filter, situated in the inbound path and coupled to the DAC to receive the inbound audio bitstream, the filter being further coupled to the outbound path to receive the outbound audio bitstream, the filter adding the outbound bitstream as a sidetone to the inbound audio bitstream to produce a resultant signal, the filter also filtering the resultant signal to provide an analog audio signal with sidetone.

12. The wireless communication device of claim 11, wherein the ADC comprises a delta sigma ADC.

13. The wireless communication device of claim 11, wherein the DAC comprises a delta sigma DAC.

14. The wireless communication device of claim 11, wherein the filter comprises a switched capacitor filter.

15. The wireless communication device of claim 11, wherein the filter comprises a continuous time filter.

16. The wireless communication device of claim 11, wherein the filter cancels a DC offset exhibited by the outbound audio bitstream that is supplied to the filter as the sidetone.

17. The wireless communication device of claim 11, further comprising:
RF circuitry including the transmitter and receiver;
digital processing circuitry; and
a controller, coupled to the RF circuitry and the digital processing circuitry, that activates the RF circuitry and inactivates the digital processing circuitry during first periods of time, the controller inactivating the RF circuitry and activating the digital processing circuitry during second periods of time.

18. An integrated circuit device comprising:
a transmitter situated in an outbound path;
a receiver situated in an inbound path;
an analog to digital converter (ADC), situated in the outbound path, that converts an outbound analog audio signal to an outbound audio bitstream that is supplied to the transmitter;
a digital to analog converter (DAC), situated in the inbound path, that converts an inbound digital audio signal, received by the receiver, to an inbound audio bitstream; and
a filter, situated in the inbound path and coupled to the DAC to receive the inbound audio bitstream, the filter being further coupled to the outbound path to receive the outbound audio bitstream, the filter adding the outbound bitstream as a sidetone to the inbound audio bitstream to produce a resultant signal, the filter also filtering the resultant signal to provide an analog audio signal with sidetone.

19. The integrated circuit device of claim 18, wherein the ADC comprises a delta sigma ADC.

20. The integrated circuit device of claim 18, wherein the DAC comprises a delta sigma DAC.

21. The integrated circuit device of claim 18, wherein the filter comprises a switched capacitor filter.

22. The integrated circuit device of claim 18, wherein the filter comprises a continuous time filter.

23. The integrated circuit device of claim 18, wherein the filter cancels a DC offset exhibited by the outbound audio bitstream that is supplied to the filter as the sidetone.

24. The integrated circuit device of claim 18, further comprising:
RF circuitry including the transmitter and receiver;
digital processing circuitry; and
a controller, coupled to the RF circuitry and the digital processing circuitry, that activates the RF circuitry and inactivates the digital processing circuitry during first periods of time, the controller inactivating the RF circuitry and activating the digital processing circuitry during second periods of time.

25. A wireless communication device comprising:
an analog to digital converter (ADC) that converts an outbound analog audio signal to an outbound audio bitstream;
a transmitter, coupled to the ADC, that transmits the outbound audio bitstream;
a receiver that receives an inbound digital audio bitstream;
a digital to analog converter (DAC), coupled to the receiver, that converts the inbound digital audio signal to an inbound audio bitstream; and
a filter, coupled to the ADC and the DAC, the filter both adding the outbound bitstream as a sidetone to the inbound audio bitstream to produce a resultant signal and also filtering the resultant signal to provide an analog audio signal with sidetone.

26. The wireless communication device of claim 25, wherein the ADC comprises a delta sigma ADC.

27. The wireless communication device of claim 25, wherein the DAC comprises a delta sigma DAC.

28. The wireless communication device of claim 25, wherein the filter comprises a switched capacitor filter.

29. The wireless communication device of claim 25, wherein the filter comprises a continuous time filter.

30. The wireless communication device of claim 25, wherein the filter cancels a DC offset exhibited by the outbound audio bitstream that is supplied to the filter as the sidetone.

31. The wireless communication device of claim 25, further comprising:

RF circuitry including the transmitter and receiver;
digital processing circuitry; and
a controller, coupled to the RF circuitry and the digital processing circuitry, that activates the RF circuitry and inactivates the digital processing circuitry during first periods of time, the controller inactivating the RF circuitry and activating the digital processing circuitry during second periods of time.

* * * * *